(12) United States Patent
Qiu et al.

(10) Patent No.: US 11,280,423 B2
(45) Date of Patent: Mar. 22, 2022

(54) TEMPERATURE THERMOSTATIC VALVE

(71) Applicant: ZHEJIANG SANHUA AUTOMOTIVE COMPONENTS CO., LTD, Zhejiang (CN)

(72) Inventors: Haoming Qiu, Zhejiang (CN); Xiaojun Qian, Zhejiang (CN); Xiaodan Lv, Zhejiang (CN); Yang Lv, Zhejiang (CN)

(73) Assignee: ZHEJIANG SANHUA AUTOMOTIVE COMPONENTS CO., LTD.

( * ) Notice: Subject to any disclaimer, the term of this patent is extended or adjusted under 35 U.S.C. 154(b) by 0 days.

(21) Appl. No.: 17/255,071

(22) PCT Filed: Jun. 13, 2019

(86) PCT No.: PCT/CN2019/091052
§ 371 (c)(1),
(2) Date: Dec. 22, 2020

(87) PCT Pub. No.: WO2020/001279
PCT Pub. Date: Jan. 2, 2020

(65) Prior Publication Data
US 2021/0270383 A1    Sep. 2, 2021

(30) Foreign Application Priority Data
Jun. 24, 2018   (CN) .......................... 201810656329.1

(51) Int. Cl.
F16K 31/00   (2006.01)
F16K 11/07   (2006.01)
(Continued)

(52) U.S. Cl.
CPC ........ *F16K 31/002* (2013.01); *F16K 11/0712* (2013.01); *F16K 27/041* (2013.01); *F16H 57/0413* (2013.01)

(58) Field of Classification Search
CPC .............. F16K 31/002; F16K 11/0712; F16K 27/041; F16H 57/0413; F01P 2060/045; G05D 23/1333
See application file for complete search history.

(56) References Cited

U.S. PATENT DOCUMENTS 2,396,138 A * 3/1946 Vernet ................ G05D 23/1333
60/527
4,883,082 A * 11/1989 Pirkle ....................... E03B 7/10
137/62
(Continued)

FOREIGN PATENT DOCUMENTS

CN   102954198 A   3/2013
CN   103671854 A   3/2014
(Continued)

OTHER PUBLICATIONS

Wang, Cuiting, First Office Action for CN App. No. 201810656329.1, dated Jul. 31, 2020, 8 pages, China National Intellectual Property Administration, China.
(Continued)

*Primary Examiner* — Umashankar Venkatesan
(74) *Attorney, Agent, or Firm* — Crain Caton and James

(57) ABSTRACT

Provided is a thermostatic valve including a first valve body, a second valve body, a third valve body, a first thermal actuator, a second thermal actuator, a valve core, a first valve port, a second valve port and a third valve port. The first valve body includes a second cavity and a third cavity. The second thermal actuator is sealedly fixed in the first valve body to isolate the second cavity from the third cavity. At least a part of the valve core is located in the second cavity.

(Continued)

The valve core is connected to, or is integrated with, or abuts against a second valve stem of the second thermal actuator. The second thermal actuator is configured to act in response to a change in temperature of a fluid in the third cavity. The valve core is configured to open the second valve port or the third valve port in response to an action of the second valve stem.

18 Claims, 6 Drawing Sheets

(51) Int. Cl.
*F16K 27/04* (2006.01)
*F16H 57/04* (2010.01)

(56) References Cited

U.S. PATENT DOCUMENTS

| | | | | |
|---|---|---|---|---|
| 6,929,188 B2* | 8/2005 | Taylor | ............... | G05D 23/1313 236/12.12 |
| 2009/0026405 A1* | 1/2009 | Sheppard | ........... | G05D 23/1333 251/364 |
| 2016/0349770 A1* | 12/2016 | Sheppard | ............... | F16K 11/22 |
| 2017/0254604 A1* | 9/2017 | Sheppard | ............... | F01P 11/08 |

FOREIGN PATENT DOCUMENTS

| | | |
|---|---|---|
| CN | 103867692 A | 6/2014 |
| CN | 106704685 A | 5/2017 |
| CN | 107131324 A | 9/2017 |
| CN | 107448643 A | 12/2017 |
| CN | 107614950 A | 1/2018 |
| CN | 108087530 A | 5/2018 |
| DE | 102016219630 A1 | 4/2018 |
| DE | 102016014322 A1 | 6/2018 |
| JP | H08254277 A | 10/1996 |
| KR | 0148160 B1 | 8/1998 |
| WO | 2017147699 A1 | 9/2017 |

OTHER PUBLICATIONS

Patent Search Record for CN App. No. 201810656329.1, 1 page, China National Intellectual Property Administration, China.
Ma, Yuqing, International Search Report for PCT App. No. PCT/CN2019/091052, dated Sep. 18, 2019, 6 pages, China National Intellectual Property Administration, China.

* cited by examiner

TEMPERATURE THERMOSTATIC VALVE

CROSS-REFERENCE TO RELATED APPLICATIONS

This application is a U.S. National Stage Application of PCT Application Serial Number PCT/CN2019/091052, filed Jun. 13, 2019, which claims priority to Chinese Patent Application No. 201810656329.1, filed Jun. 24, 2018, the disclosures of which are incorporated herein by reference in their entirety.

TECHNICAL FIELD

The present disclosure relates to the field of fluid control technologies and, in particular, to a thermostatic valve.

BACKGROUND

The temperature of an automobile transmission fluid is mainly adjusted through a temperature control flow passage composed of a thermostatic valve and a heat exchange device for external cooling. When an automobile is just started, especially when it is started at a low temperature, the transmission fluid needs to be heated. During the operation of the automobile, when the temperature of the transmission fluid is high, the transmission fluid needs to be cooled to be kept at an appropriate working temperature.

Generally, the transmission fluid is heated by using a hot coolant in an engine. However, the coolant in the engine is not applicable to heating at any time. The coolant in the engine with a relatively low temperature will take away heat from the transmission fluid when entering a heat exchanger.

SUMMARY

The solution of the present disclosure provides a thermostatic valve. The thermostatic valve includes a first valve body, a second valve body, a third valve body, a third valve port, a first thermal actuator, a second thermal actuator, a valve core, a first valve port, a second valve port and a third valve port. The first valve body includes a second cavity and a third cavity. The second thermal actuator is sealedly fixed in the first valve body to isolate the second cavity from the third cavity. At least a part of the valve core is located in the second cavity. The valve core is connected to, or is integrated with, or abuts against a second valve stem of the second thermal actuator. The second thermal actuator is configured to act in response to a change in temperature of a fluid in the third cavity. The valve core is configured to open the second valve port or the third valve port in response to an action of the second valve stem.

One end of the second valve body is fixed to the first valve body, and another end of the second valve body is fixed to the third valve body. The third valve body includes a first cavity. The second valve body includes a flow passage. The flow passage is capable of communicating with the first cavity through the first valve port and capable of communicating with the second cavity through the second valve port.

The first thermal actuator is configured to act in response to a change in temperature of a fluid in the first cavity to open or close the first valve port or to adjust an opening degree of the first valve port.

DETAILED DESCRIPTION

Figure 1:
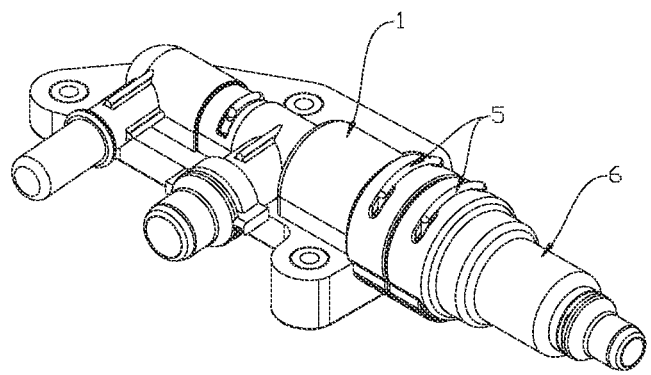
FIG. 1 is a perspective view of a thermostatic valve according to an embodiment of the present disclosure.

The embodiments of the present disclosure will be described in detail below in conjunction with the drawings.

An embodiment of the present disclosure is shown in FIGS. 1 to 16. A thermostatic valve of the embodiment includes a first valve body 1, a second valve body 2, a third valve body 6 and a circlip 5. The second valve body 2 is fixedly connected to the third valve body 6 and the first valve body 1, separately, and connection portions are sealed. The second valve body 2 includes a flow passage 100 through which the third valve body 6 may communicate with the first valve body 1.

Figure 3:
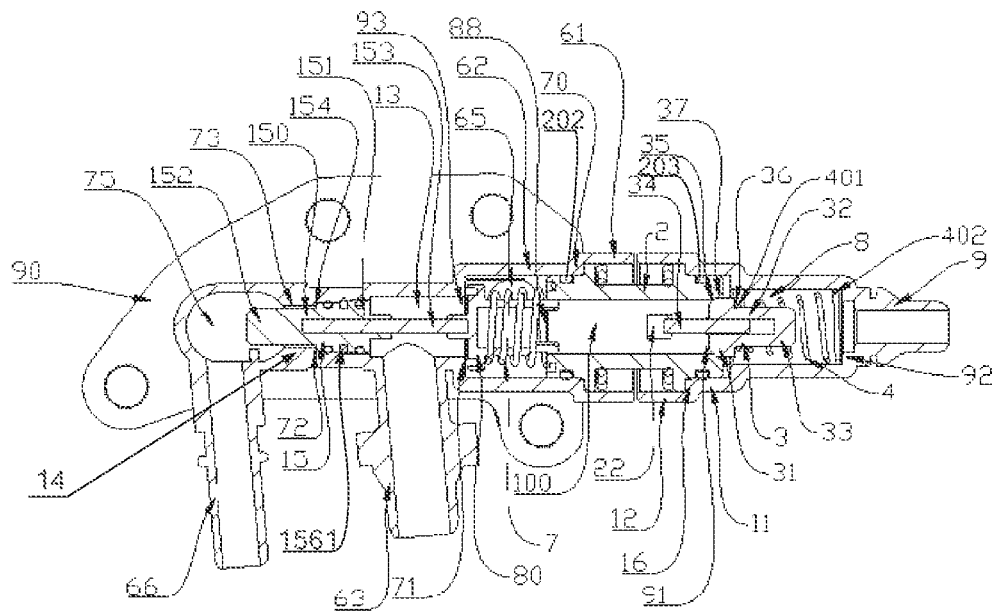
FIG. 3 is a cross-sectional view of the thermostatic valve shown in FIG. 1.
Figure 4:
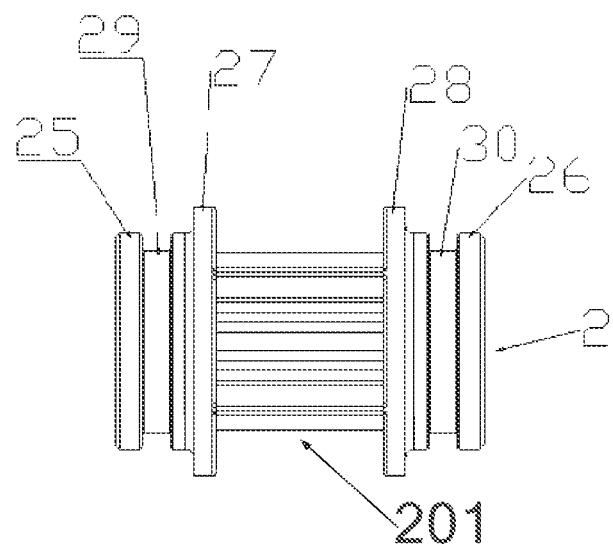
FIG. 4 is a front view of a second valve body in the thermostatic valve shown in FIG. 1.

As shown in FIG. 3, the third valve body 6 includes a first inlet passage 9 and a first connecting portion 10. The third valve body 6 further includes a first cavity 8, and the valve body corresponding to the first cavity 8 is located between the first inlet passage 9 and the first connecting portion 10. An inner wall of the third valve body 6 is formed with a first shoulder 92 on the side of the first cavity 8 facing towards the first inlet passage 9.

The first connecting portion 10 includes a small diameter portion 11 of the first connecting portion and a large diameter portion 12 of the first connecting portion. The small diameter portion 11 of the first connecting portion is closer to the first cavity 8. The inner wall of the third valve body 6 is formed with a second shoulder 16 at a position where the small diameter portion 11 of the first connecting portion is connected to the large diameter portion 12 of the first connecting portion.

A first thermal actuator 3 and a first spring 4 are arranged in the third valve body 6 of the thermostatic valve. As shown in FIG. 3, at least a part of the first thermal actuator 3 is accommodated in the first cavity 8. The first thermal actuator 3 includes a first body 32 and a first valve stem 34, where the first body 32 includes a large diameter portion 31 of the first body and a small diameter portion 33 of the first body. The first thermal actuator 3 is filled with a heat-sensitive material, one end of the first valve stem 34 extends into the first body 32, and the heat-sensitive material may change in volume as the temperature changes. The change in volume of the heat-sensitive material pushes the first valve stem 34 to move, so that the first valve stem 34 can move relative to the first body 32, or the first body 32 can move relative to the first valve stem 34.

The large diameter portion 31 of the first body is provided with a first end wall portion 35 on a side facing away from the small diameter portion 33 of the first body and a second end wall portion 36 on a side facing towards the small diameter portion 33 of the first body. The first end wall portion 35 is configured to mate with one end of the second valve body 2. When the first end wall portion 35 abuts against the one end of the second valve body 2, the flow passage 100 is closed and a first fluid in the first cavity 8 cannot pass the flow passage 100 in the second valve body 2. It should be noted here that the first fluid may be a coolant from an engine.

In this embodiment, the first spring 4 is a conical spring, the first spring 4 has a small end portion 401 and a large end portion 402, the first spring 4 is sleeved on the first body 32, the small end portion 401 abuts against the second end wall portion 36, the large end portion 402 abuts against the first shoulder 92, and the outer diameter of the large end portion 402 is approximately the same as the inner diameter of the valve body corresponding to the first cavity 8. The inner wall of the valve body corresponding to the first cavity 8 can play a limiting role to prevent the first spring 4 from shifting and make it work normally. Similarly, the arrangement of the first spring 4 sleeved on the first body 32 can also play the limiting role.

The first spring 4 is in a compressed state. Before the temperature of the first fluid reaches a set temperature, the first end wall portion 35 remains in contact with one end of the second valve body 2 under the elastic force of the first spring 4. The arrangement can prevent a low-temperature coolant from entering a heat exchanger and taking away a large amount of heat from a lubricating oil when an automobile is started at a low temperature, thereby avoiding a delay in heating the lubricating oil up. When the temperature of the coolant reaches the set temperature, the heat-sensitive material in the first thermal actuator 3 is heated and expands, the large diameter portion 31 of the first body of the first thermal actuator 3 moves towards the first inlet passage 9 until the first end wall portion 35 leaves away from the second valve body 2, the flow passage 100 is opened, and a hot coolant enters the heat exchanger to heat the lubricating oil, so that the lubricating oil is heated up quickly.

As shown in FIGS. 4 to 7, the second valve body 2 includes a tubular body 201, where the tubular body 201 includes a first port portion 25 and a second port portion 26. In this embodiment, the tubular body 201 is provided with a first annular protrusion 27 near the first port portion 25, and a first annular groove 29 is provided between the first port portion 25 and the first annular protrusion 27. The first port portion 25 can extend into the small diameter portion 11 of the first connecting portion. The tubular body 201 is provided with a second annular protrusion 28 adjacent to the second port portion 26, and a second annular groove 30 is provided between the second port portion 26 and the second annular protrusion 28.

Figure 5:
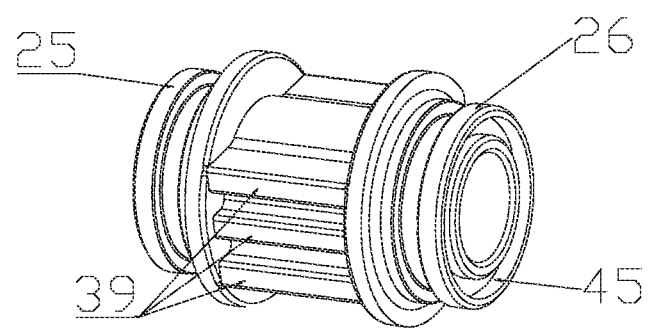
FIG. 5 is a perspective view of the second valve body shown in FIG. 4.

As shown in FIG. 5, the second port portion 26 is further provided with a first end annular groove 45 at an end of the second port portion 26. The first end annular groove 45 is recessed in an end surface of the second port portion 26, and the first end annular groove 45 opens in a direction away from the first port portion 25.

When the second valve body 2 is connected to and mates with the third valve body 6, the first port portion 25 of the second valve body 2 extends into the first connecting portion 10, and the first port portion 25 is clearance-fitted with the small diameter portion 11 of the first connecting portion. In addition, a first sealing ring 202 is provided between the first port portion 25 and the small diameter portion 11 of the first connecting portion. The first annular protrusion 27 is clearance-fitted with the large diameter portion 12 of the first connecting portion, and the first annular protrusion 27 abuts against the second shoulder 16. A part of the first sealing ring 202 may be accommodated in the first annular groove 29, and the first sealing ring 202 can play a sealing role at a position where the second valve body 2 is connected to the third valve body 6. A conical wall portion 37 is formed on the inner circumferential surface of the first port portion 25. The conical wall portion 37 mates with the first end wall portion 35 of the first thermal actuator 3. When the first end wall portion 35 abuts against the conical wall portion 37, the flow passage 100 in the second valve body 2 is closed.

Figure 7:
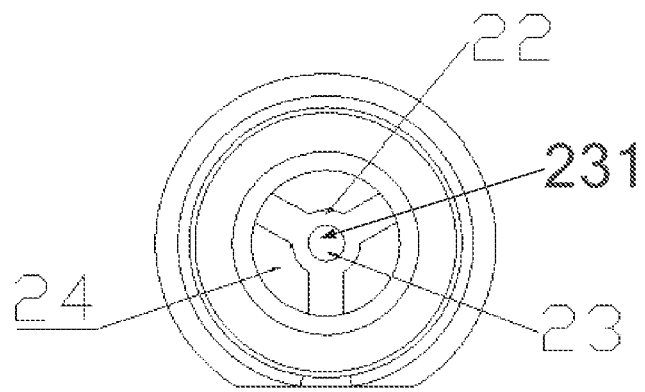
FIG. 7 is a left view of the second valve body shown in FIG. 5.

As shown in FIGS. 3 and 7, the inner wall of the second valve body 2 facing towards the first port portion 25 is provided with a valve stem seat 22. In this embodiment, the valve stem seat 22 includes a blind hole portion 23 and a communicating hole 24, where the communicating hole 24 is in communication with flow passages on both sides of the valve stem seat 22, and the blind hole portion 23 is provided with a blind hole 231. The valve stem seat 22 is fixedly connected to the tubular body 201, or the valve stem seat 22 may be integrated with the tubular body 201.

One end of the first valve stem 34 extends into the blind hole 231, the first valve stem 34 is clearance-fitted with the blind hole 231, and the first valve stem 34 abuts against the bottom of the blind hole 231 to be limited. Therefore, when the heat-sensitive material expands or contracts, the other end of the first valve stem 34 drives the first body 32 to move away from or towards the first port portion 25.

Figure 8:
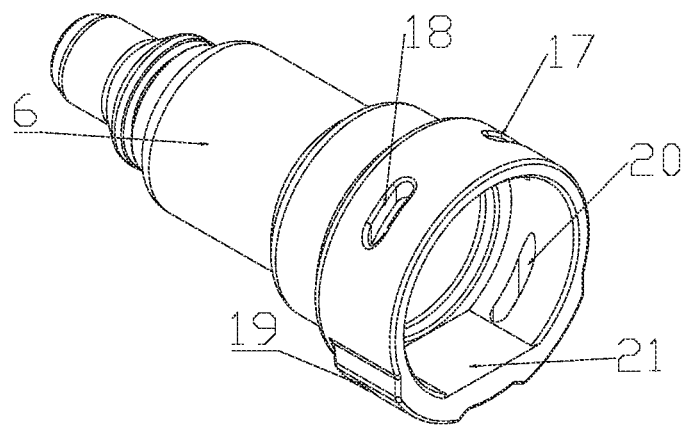
FIG. 8 is a perspective view of a first valve body in the thermostatic valve shown in FIG. 1.

As shown in FIG. 8, the circumferential surface of the large diameter portion 12 of the first connecting portion is provided with a first through hole 17, a second through hole 18, a third through hole 19 and a fourth through hole 20. The circlip 5 mates with the first through hole 17, the second through hole 18, the third through hole 19 and the fourth through hole 20 to achieve a fixed connection between the third valve body 6 and the second valve body 2, which are simple to install and convenient to disassemble.

As shown in FIG. 8, the inner circumferential surface of the large diameter portion 12 of the first connecting portion is provided with a first planar portion 21 between the third through hole 19 and the fourth through hole 20, and the first planar portion 21 may extend from one end to the other end of the inner circumferential surface of the large diameter portion 12 of the first connecting portion, or at least a part of the inner circumferential surface of the large diameter portion 12 of the first connecting portion is configured to be a planar structure. The first planar portion 21 mates with the second valve body 2 to prevent the relative rotation between the second valve body 2 and the third valve body 6. The shape of the first planar portion 21 may be a square or a circle, and the first planar portion 21 can play a limiting role.

Figure 6:
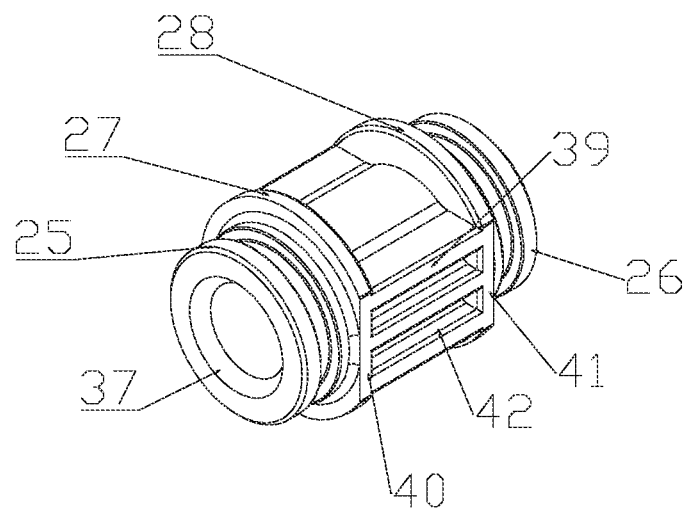
FIG. 6 is a perspective view of the second valve body shown in FIG. 5 from another perspective.

As shown in FIGS. 5 and 6, a plurality of reinforcing ribs 39 are further provided between the first annular protrusion 27 and the second annular protrusion 28. In the present embodiment, the number of the reinforcing ribs 39 is 6, and the first annular protrusion 27 and the second annular protrusion 28 are fixedly connected by the reinforcing ribs 39. The reinforcing ribs 39 are symmetrically arranged on both sides of the tubular body 201 of the second valve body 2, so that through the symmetrical arrangement of the reinforcing ribs 39, the second valve body 2 is subjected to forces uniformly, the strength of the second valve body 2 can be increased, and the service life of the second valve body 2 can be prolonged.

The reinforcing rib 39 is fixedly connected to the tubular body 201 on the side of the reinforcing rib 39 facing towards the tubular body 201, and the height of the reinforcing rib 39 in a radial direction is not greater than the height of the first annular protrusion 27 and the height of the second annular protrusion 28 in the radial direction. The reinforcing ribs 39, the tubular body 201, the first annular protrusion 27 and the second annular protrusion 28 may be an integral structure.

Figure 9:
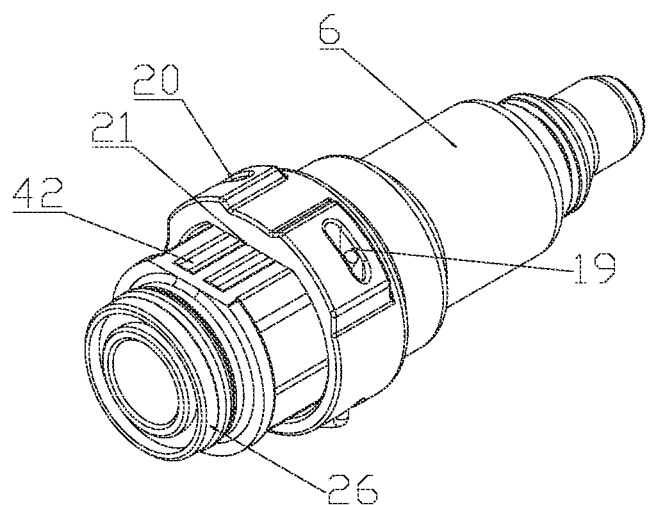
FIG. 9 is a perspective view of a third valve body mating with a second valve body.

The end faces of three reinforcing ribs 39 on one side of the tubular body 201 facing away from the tubular body 201 are located on the same plane or approximately located on the same plane, where the first annular protrusion 27 is provided with a first platform portion 40 at an intersection with the plane, the second annular protrusion 28 is provided with a second platform portion 41 at an intersection with the plane, and the end surface of the first platform portion 40 and the end surface of the second platform portion 41 are located on the same plane as the plane. A virtual planar portion formed by the first platform portion 40, the second platform portion 41 and the ends of the reinforcing ribs 39 is defined as a second planar portion 42. When the second valve body 2 is connected to the first connecting portion 10, as shown in FIG. 9, the first planar portion 21 mates with one end of the second planar portion 42 to play a limiting role. The relative rotation between the second valve body 2 and the third valve body 6 can be prevented during use, thereby avoiding the wear out failure of the first sealing ring 202 due to long-term relative rotation.

Figure 10:
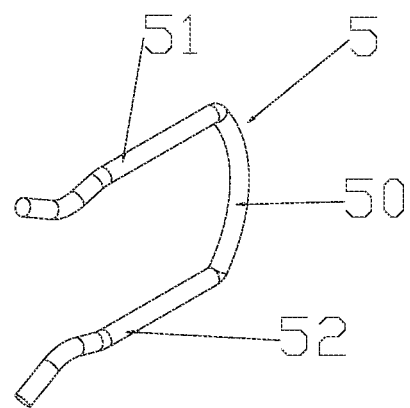
FIG. 10 is a perspective view of a circlip in the thermostatic valve shown in FIG. 1.

FIG. 10 is a perspective view of the circlip 5. The circlip 5 is roughly U-shaped and includes a main body 50, a first branch 51 and a second branch 52. The first branch 51 penetrates through the second through hole 18 and the third through hole 19, the second branch 52 penetrates through the first through hole 17 and the fourth through hole 20, and the first branch 51 and the second branch 52 are located on two sides of the tubular body 201. A maximum distance between the first branch 51 and the second branch 52 is less than the outer diameter of the first annular protrusion 27. The first annular protrusion 27 is disposed between the second shoulder 16 and the circlip 5, and the first branch 51 and the second branch 52 abut against the first annular protrusion 27. This arrangement can achieve a firm connection between one end of the second valve body 2 and the third valve body 6 which are convenient to disassemble and assemble. The other end of the second valve body 2 may also be detachably connected to the first valve body 1 in this connection manner.

Figure 2:
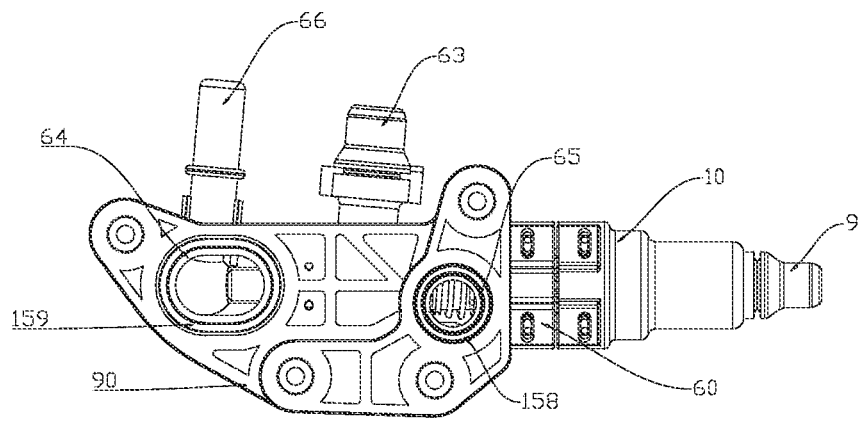
FIG. 2 is a rear view of the thermostatic valve shown in FIG. 1.

As shown in FIGS. 2 and 3, the first valve body 1 includes a second connecting portion 60, a second inlet passage 63, a third inlet passage 64, a first outlet passage 65 and a second outlet passage 66, the second connecting portion 60 includes a large diameter portion 61 of the second connecting portion and a small diameter portion 62 of the second connecting portion, the first valve body 1 is further provided with a second cavity 13 and a third cavity 75, and the second cavity 13 is partially formed in the small diameter portion 62 of the second connecting portion.

The inner wall of the first valve body 1 is formed with a third shoulder 70 at a position where the large diameter portion 61 of the second connecting portion is connected to the small diameter portion 62 of the second connecting portion. The inner wall of the first valve body 1 corresponding to the second cavity 13 is provided with a valve seat, and the valve seat includes a fourth shoulder 71.

When the second valve body 2 is connected to and mates with the first valve body 1, the second port portion 26 of the second valve body 2 extends into the second connecting portion 60, and the second port portion 26 is clearance-fitted with the small diameter portion 62 of the second connecting portion. The second annular protrusion 28 is clearance-fitted with the large diameter portion 61 of the second connecting portion, and the second annular protrusion 28 abuts against the third shoulder 70. A second sealing ring 203 is provided between the second port portion 26 and the small diameter portion 62 of the second connecting portion. In the present embodiment, a part of the second sealing ring 203 may be accommodated in the second annular groove 30, and the sealing ring 203 plays a sealing role at a position where the second valve body 2 is connected to the first valve body 1.

Figure 11:
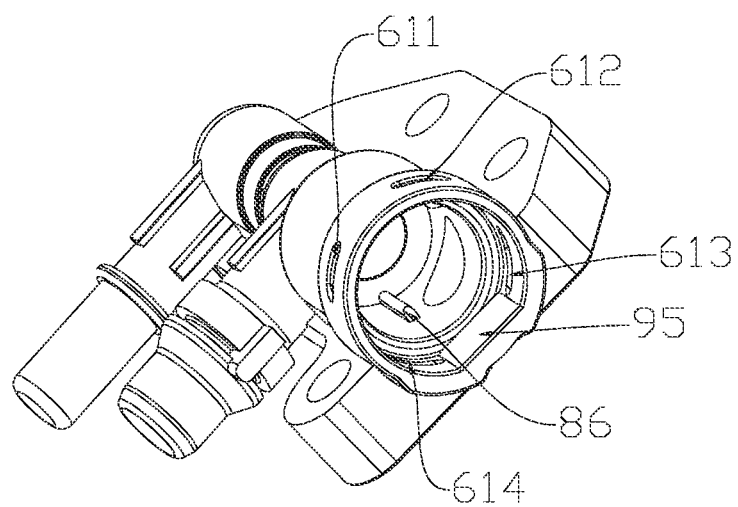
FIG. 11 is a perspective view of a first valve body in the thermostatic valve shown in FIG. 1.

As shown in FIG. 11, the circumferential surface of the large diameter portion 61 of the second connecting portion is provided with a fifth through hole 611, a sixth through hole 612, a seventh through hole 613 and an eighth through hole 614. The circlip 5 mates with the fifth through hole 611, the sixth through hole 612, the seventh through hole 613 and the eighth through hole 614 to achieve a fixed connection between the first valve body 1 and the second valve body 2. The connection manner is the same as or similar to the connection manner of the second valve body 2 and the third valve body 6 and will not be repeated here. It should be noted here that the fixed connection between the third valve body 6 and the second valve body 2 and the fixed connection between the second valve body 2 and the first valve body 1 may also be bolted connections or other common connections.

As shown in FIG. 11, the inner circumferential surface of the large diameter portion 61 of the second connecting portion is provided with a third planar portion 95 between the seventh through hole 613 and the eighth through hole 614, and the third planar portion 95 extends from one end to the other end of the inner circumferential surface of the large diameter portion 61 of the second connecting portion, or at least a part of the inner circumferential surface is configured to be a planar structure. When the first valve body 1 is connected to the second valve body 2, the third planar portion 95 mates with one end of the second planar portion 42 to play a limiting role. The relative rotation between the second valve body 2 and the first valve body 1 can be prevented during use, thereby avoiding the wear out failure of the second sealing ring 203 due to long-term relative rotation. The shape of the third planar portion 95 may be a square or a circle.

As shown in FIG. 3, the first outlet passage 65 is in communication with the second cavity 13 at the small diameter portion 62 of the second connecting portion. The second inlet passage 63 is in communication with the second cavity 13, and the position where the second inlet passage 63 is in communication with the second cavity 13 is located between the valve body corresponding to a large diameter portion 151 of a second body and the small diameter portion 62 of the second connecting portion. A circulation port surrounded by the fourth shoulder 71 is located between the position where the second inlet passage 63 is in communication with the second cavity 13 and the position where the first outlet passage 65 is in communication with the second cavity 13. A second fluid flows in the second inlet passage 63. It should be noted here that the second fluid may be a coolant with the lower temperature from a cooler.

As shown in FIGS. 2 and 3, the third inlet passage 64 is in communication with the third cavity 75, and the second outlet passage 66 also is in communication with the third cavity 75. The first valve body 1 is provided with a seat hole portion 14 between the inner wall corresponding to the second cavity 13 and the inner wall corresponding to the third cavity 75. The seat hole portion 14 includes a seat hole 73, and a fifth shoulder 72 is formed around the end of the seat hole portion 14 adjacent to the third cavity 75.

Figure 13:
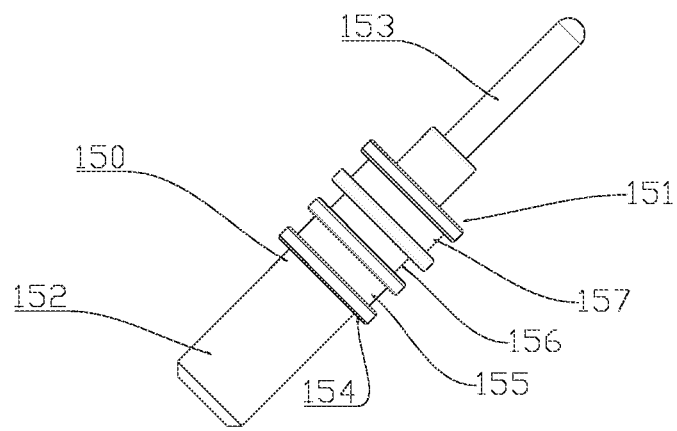
FIG. 13 is a perspective view of a second thermal actuator in the thermostatic valve shown in FIG. 1.

As shown in FIG. 13, the thermostatic valve is further provided with a second thermal actuator 15 in the first valve body 1, where the second thermal actuator 15 includes the second body 150 and a second valve stem 153, and the second body 150 includes the large diameter portion 151 of the second body and a small diameter portion 152 of the second body. The second thermal actuator 15 is filled with the heat-sensitive material, one end of the second valve stem 153 extends into the second body 150, and the heat-sensitive material may change in volume as the temperature changes. The change in volume of the heat-sensitive material pushes the second valve stem 153 to move, so that the second valve stem 153 can move relative to the second body 150, or the second body 150 can move relative to the second valve stem 153. It should be noted here that in the present embodiment, the second body 150 is fixed to the first valve body 1, and the second valve stem 153 moves relative to the second body 150.

The large diameter portion 151 of the second body is provided with a third end wall portion 154 on a side facing towards the small diameter portion 152 of the second body, and the circumferential surface of the large diameter portion 151 of the second body is further provided with a third annular groove 155, a fourth annular groove 156 and a fifth annular groove 157, where the fourth annular groove 156 is disposed between the third annular groove 155 and the fifth annular groove 157. The diameter of the small diameter portion 152 of the second body is less than the inner diameter of the seat hole 73, and the diameter of the large diameter portion 151 of the second body is greater than the inner diameter of the seat hole 73.

As shown in FIG. 3, a part of the second thermal actuator 15 is located in the second cavity 13 and a part of the second thermal actuator 15 is located in the third cavity 75. In the present embodiment, the small diameter portion 152 of the second body penetrates through the seat hole 73 into the third cavity 75. The second thermal actuator 15 enables the second valve stem 153 to move along an axial direction in response to the temperature of a third fluid flowing in the third cavity 75. It should be noted here that the third fluid may be the lubricating oil. It should be further noted here that on the premise that the diameter of the large diameter portion 151 of the second body is greater than the inner diameter of the seat hole 73, the inner diameter of the seat hole 73 may be greater than the diameter of the small diameter portion 152 of the second body as much as possible, that is, the space between the small diameter portion 152 of the second body and the inner wall of the seat hole portion 14 is maximized. The space is in communication with the third cavity 75, so that this arrangement enables the lubricating oil to enter the space and come into full contact with the small diameter portion 152 of the second body, thereby increasing the speed at which the second thermal actuator 15 responds to an oil temperature.

The third end wall portion 154 of the large diameter portion 151 of the second body abuts against the fifth shoulder 72, and the large diameter portion 151 of the second body is clearance-fitted or interference fitted with the inner wall of the corresponding seat hole portion 14. The third annular groove 155 and the fifth annular groove 157 are provided with a third sealing ring 1501, separately. The third sealing rings 1501 can isolate fluids in the second cavity 13 and the third cavity 75 to prevent one fluid from contaminating the other fluid.

Figure 14:
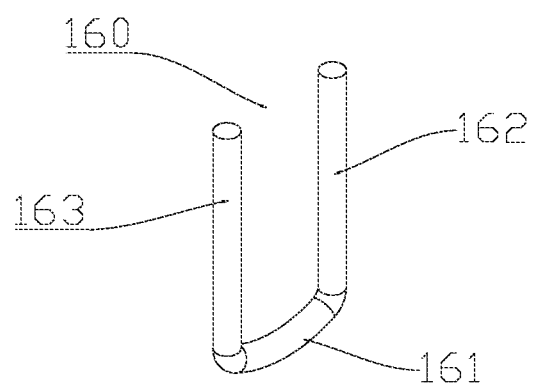
FIG. 14 is a perspective view of a clip in the thermostatic valve shown in FIG. 1.

The thermostatic valve is further provided with a clip 160 at the fourth annular groove 156. As shown in FIG. 14, the clip 160 is roughly U-shaped, and the clip 160 includes a clip body 161, a first clip branch 162 and a second clip branch 163. The first valve body 1 is provided with four ninth through holes 1561 at the valve body corresponding to the fourth annular groove 156, the first clip branch 162 penetrates through two ninth through holes 1561, and the second clip branch 163 penetrates through the other two ninth through holes 1561. The first clip branch 162 and the second clip branch 163 mates with the fourth annular groove 156 to fix the second thermal actuator 15. The arrangement of the four ninth through holes 1561 can also be used to check the leakage of the lubricating oil in the third cavity 75 and the leakage of the coolant in the second cavity 13.

Figure 15:
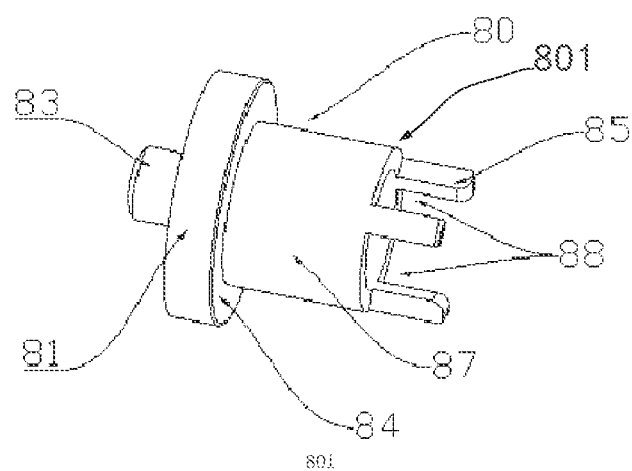
FIG. 15 is a perspective view of a valve core in the thermostatic valve shown in FIG. 1.
Figure 16:
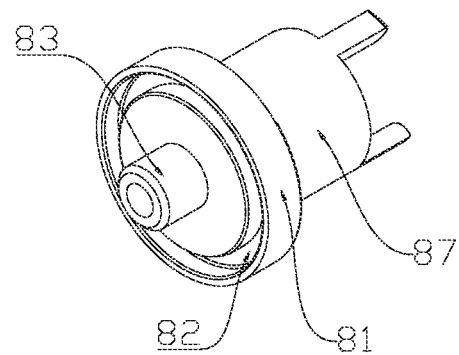
FIG. 16 is a perspective view of a valve core in the thermostatic valve shown in FIG. 1 from another perspective.

The thermostatic valve further includes a valve core 80, where at least a part of the valve core 80 is located in the second cavity 13. As shown in FIGS. 15 and 16, the valve core 80 includes a cylindrical main body portion 801, where the main body portion 801 includes a large diameter portion 81 and a small diameter portion 87. The large diameter portion 81 is provided with an annular protrusion 83 at the center or around the center of the large diameter portion 81, on a side of the large diameter portion 81 facing away from the small diameter portion 87 and in a direction away from the large diameter portion 81. The large diameter portion 81 is further provided with a second end annular groove 82 on the side of the large diameter portion 81 facing away from the small diameter portion 87. The second end annular groove 82 is recessed in the end surface of the large diameter portion 81, and the second end annular groove 82 opens in a direction away from the small diameter portion 87. The large diameter portion 81 is further provided with an annular wall portion 84 on the side of the large diameter portion 81 facing towards the small diameter portion 87.

The valve core 80 is further provided with at least one column-shaped portion 85 at the end of the small diameter portion 87 facing away from the large diameter portion 81. The column-shaped portion 85 extends in the axial direction on the end surface of the small diameter portion 87, both the small diameter portion 87 and the column-shaped portion 85 can extends into the flow passage 100, and the small diameter portion 87 and the column-shaped portion 85 are slidably fitted with the inner wall corresponding to the flow passage 100. In the present embodiment, three column-shaped portions 85 are uniformly provided on the end face of the small diameter portion 87, and a fluid circulation port is formed between any two column-shaped portions 85 (hereinafter, the fluid circulation port is also referred to as a second valve port 88). The end of the second valve stem 153 facing away from the small diameter portion 152 of the second body extends into the annular protrusion 83 and abuts against the large diameter portion 81. The second valve stem 153 is clearance-fitted with the annular protrusion 83. It should be noted here that when the number of the column-shaped portion 85 is one, the column-shaped portion 85 may be configured to be an arc-shaped column with a larger radian, so as to be slidably fitted with the inner wall corresponding to the flow passage 100.

The thermostatic valve further includes a second spring 7 sleeved on the small diameter portion 87 of the valve core 80. One end of the second spring 7 abuts against the annular wall portion 84, and the other end of the second spring 7 abuts against the first end annular groove 45. The first end annular groove 45 can play a limiting role to prevent the second spring 7 from shifting and make it work normally. Similarly, the arrangement of the second spring 7 sleeved on the small diameter portion 87 of the valve core 80 can also play the limiting role.

The second spring 7 is in a compressed state. When the third fluid in the third cavity 75 has a relatively low temperature, the large diameter portion 81 of the valve core 80 keeps abutting against the fourth shoulder 71 under the elastic force of the second spring 7, so that the second fluid from the second inlet passage 63 cannot flow to the first outlet passage 65. At this time, the column-shaped portion 85 of the valve core 80 partially extends into the flow passage 100 in the second valve body 2, that is, the fluid circulation port (that is, the second valve port 88) is in an open state, and the first fluid in the flow passage 100 can flow to the first outlet passage 65. The first valve body 1 is further provided with a fourth sealing ring at the second end annular groove 82, and the fourth sealing ring plays a sealing role between the large diameter portion 81 of the valve core 80 and the fourth shoulder 71.

When the third fluid in the third cavity 75 has a relatively high temperature, the heat-sensitive material in the second thermal actuator 15 is heated and expands, and the second valve stem 153 moves towards the second valve body 2 to push the valve core 80 to move towards the second valve body 2. In this way, the large diameter portion 81 leaves away from the fourth shoulder 71 until the column-shaped portion 85 totally enters the flow passage 100, so that the second fluid from the second inlet passage 63 can flow to the first outlet passage 65, and the fluid circulation port (that is, the second valve port 88) is in a closed state, and the first fluid from the second valve body 2 cannot flow to the first outlet passage 65. Through the cooperation of the second thermal actuator 15, the valve core 80 and the second spring 7, it is possible to control different fluids to flow to the first outlet passage 65 at different temperatures. Relatively speaking, the thermostatic valve is simple in structure with fewer parts and convenient to install.

Figure 12:
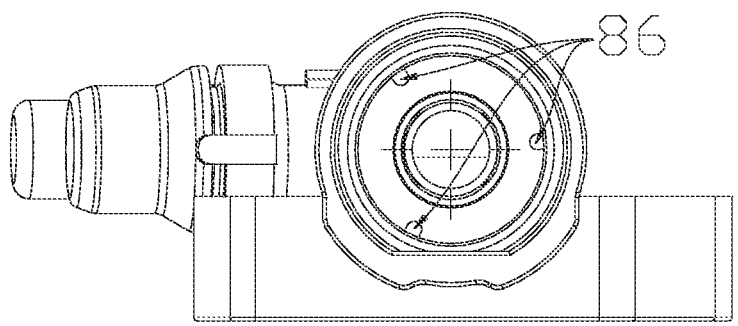
FIG. 12 is a left view of the first valve body shown in FIG. 11.

When the valve core 80 moves in the axial direction, the column-shaped portion 85 plays a guiding role. As shown in FIGS. 11 and 12, a guiding rib 86 is further provided on the inner circumferential surface of the small diameter portion 62 of the second connecting portion. The guiding rib 86 extends in the axial direction at the position where the fourth shoulder 71 is connected to the inner circumferential surface of the small diameter portion 62 of the second connecting portion. The length of the guiding rib 86 extending in the axial direction is less than a distance between the fourth shoulder 71 and the second port portion 26. When the valve core 80 moves in the axial direction, the guiding ribs 86 mate with the circumferential surface of the large diameter portion 81 to play the guiding role. In the present embodiment, three guiding ribs 86 are uniformly provided on the inner circumferential surface of the small diameter portion 62 of the second connecting portion.

The opening direction of the third inlet passage 64 and the opening direction of the first outlet passage 65 may be located on the same side of the thermostatic valve, and the first valve body 1 is further provided with a mounting plate 90 on the side of the third inlet passage 64 and the first outlet passage 65. The mounting plate 90 is provided with a plurality of mounting holes, and the mounting plate 90 may be integrated with the first valve body 1. The thermostatic valve herein may be installed on other devices such as the heat exchanger through the mounting plate 90. The first outlet passage 65 of the thermostatic valve is connected to an inlet of the coolant in the heat exchanger, and the third inlet passage 64 of the thermostatic valve is connected with an outlet of the lubricating oil of the heat exchanger. The first outlet passage 65 is further provided with a sixth annular groove 158 at or around the position where the inlet of the coolant in the heat exchanger is connected, the third inlet passage 64 is further provided with a seventh annular groove 159 at or around the position where the outlet of the lubricating oil of the heat exchanger is connected, and the sixth annular groove 158 and the seventh annular groove 159 are each provided with a fifth sealing ring, so as to achieve sealing at the connections.

It should be noted here that the first valve body 1, the second valve body 2, the third valve body 6 and the valve core 80 of the thermostatic valve may all be made of plastic materials, so that not only the weight of the thermostatic valve is reduced, but also the first valve body 1, the second valve body 2, the third valve body 6 and the valve core 80 of the thermostatic valve can be integrally formed through an injection molding process. In addition, a plastic housing also has a thermal insulation effect and reduces the heat exchange between an oil passage and a coolant passage, thereby preventing the temperature sensing of the thermal actuator from being disturbed.

In an automobile transmission fluid cooling system, the first inlet passage 9 of the thermostatic valve may be connected to the outlet of a coolant in the engine, and the second inlet passage 63 of the thermostatic valve may be connected to the outlet of a coolant in a cooler. For ease of description, the port of the flow passage 100 in the second valve body 2 closer to one end of the first inlet passage 9 is referred to as a first valve port 91, the fluid circulation port is referred to as the second valve port 88, and the circulation port surrounded by the fourth shoulder 71 is referred to as a third valve port 93, the first fluid is referred to as a first coolant, and the second fluid is referred to as a second coolant.

The thermostatic valve in the present disclosure includes at least two working states: a first working state and a second working state. In the first working state, the first valve port 91 and the third valve port 93 are closed, the second valve port 88 is opened, the first inlet passage 9 does not communicate with the first outlet passage 65, and the second inlet passage 63 does not communicate with the first outlet passage 65. In the second working state, the third valve port 93 is closed, the first valve port 91 and the second valve port 88 are opened, the first inlet passage 9 is in communication with the first outlet passage 65, and the second inlet passage 63 does not communicate with the first outlet passage 65.

The thermostatic valve of the present disclosure is disposed in the automobile transmission fluid cooling system, so that when the automobile is started at a low temperature, the first coolant and the lubricating oil both have a relatively low temperature, the heat-sensitive material in the first thermal actuator 3 and the heat-sensitive material in the second thermal actuator 15 are both in a contracted or relatively contracted state, the first spring 4 keeps the first end wall portion 35 in contact with the conical wall portion 37 of the second valve body 2 and the first valve port 91 is closed, the second spring 7 keeps the large diameter portion 81 of the valve core 80 in contact with the fourth shoulder 71 and the third valve port 93 is closed, and at the same time, the second valve port 88 is opened. At this time, the low-temperature first coolant and second coolant cannot enter the heat exchanger to take away heat from the lubricating oil. When the temperature of the first coolant increases and reaches the set temperature, the heat-sensitive material in the first thermal actuator 3 is heated and expands, and the large diameter portion 31 of the first body of the first thermal actuator 3 moves towards the first inlet passage 9 until the first end wall portion 35 leaves the conical wall portion 37 and the first valve port 91 is opened. At this time, the second valve port 88 is kept in an open state, and the third valve port 93 is kept in a closed state, so that the hot first coolant enters the heat exchanger to heat the lubricating oil, and the lubricating oil is heated up quickly.

When the lubricating oil reaches an expected temperature, the heat-sensitive material in the second thermal actuator 15 is heated and expands, and the second valve stem 153 moves towards the second valve body 2 to push the valve core 80 to move towards the second valve body 2. At this time, the second valve port 88 is partially closed, the third valve port 93 is partially opened, and the first valve port 91 is in an open state, so that the first coolant and the second coolant can both enter the heat exchanger to keep the lubricating oil at a constant temperature as much as possible.

If the lubricating oil exceeds the expected temperature, the movement distance of the second valve stem 153 towards the second valve body 2 is further increased, and the movement distance of the valve core 80 towards the second valve body 2 is also increased until the column-shaped portion 85 totally extends into the flow passage 100. At this time, the second valve port 88 is totally closed to prevent the hot first coolant from entering the heat exchanger, and at the same time, the third valve port 93 is totally opened to allow more second coolant to enter the heat exchanger and cool the lubricating oil to the maximum.

If the lubricating oil has at too high a temperature, the valve core 80 continues moving towards the second valve body 2. At this time, the small diameter portion 87 partially extends into the flow passage 100, and the second spring 7 is further compressed, which can effectively buffer the excessive deformation of the second thermal actuator 15 and can avoid a damage to the thermostatic valve.

Figure 17:
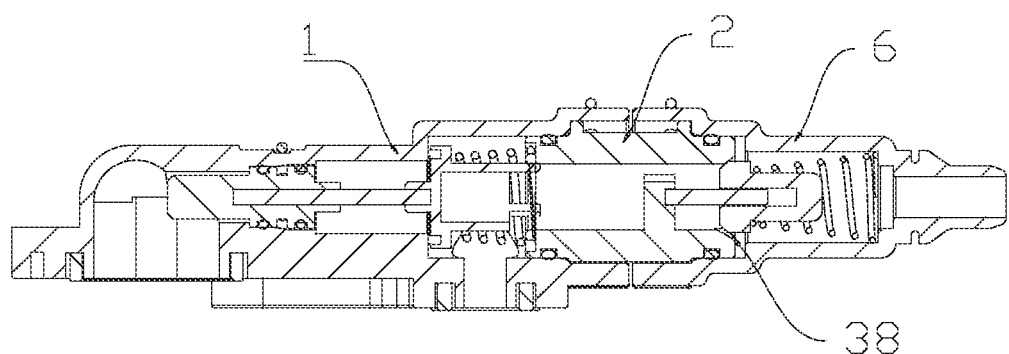
FIG. 17 is a sectional view of a thermostatic valve according to another embodiment of the present disclosure.
Figure 18:
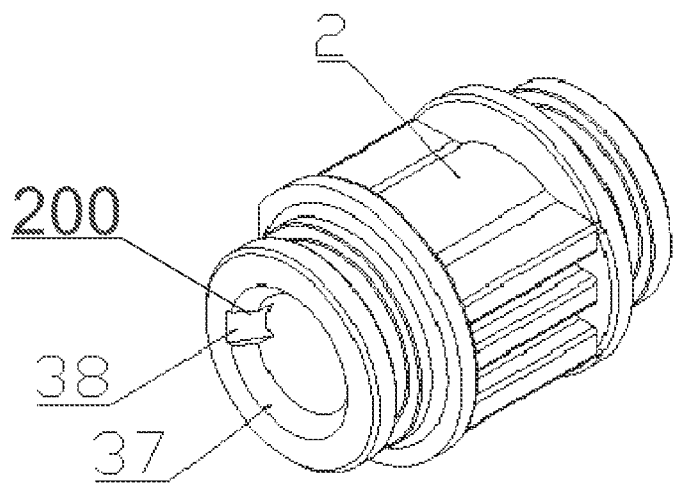
FIG. 18 is a perspective view of a second valve body in the thermostatic valve shown in FIG. 17.

FIG. 17 is a sectional view of a thermostatic valve according to another embodiment of the present disclosure, and FIG. 18 is a perspective view of a second valve body in the thermostatic valve in FIG. 17. In the present embodiment, the conical wall portion 37 of the second valve body 2 is provided with a passage 200, and the number of the passages 200 is greater than or equal to 1. In the present embodiment, the passage 200 is roughly a square groove 38. When the first end wall portion 35 of the thermal actuator 3 abuts against the conical wall portion 37, the groove 38 is still in communication with the first cavity 8 with the flow passage 100 in the second valve body 2, and the flow rate of the groove 38 is much less than that of the flow passage 100 in the second valve body 2 and specifically determined by the system.

By providing the groove 38, when the automobile is started and before the first coolant reaches the set temperature, microcirculation can be performed. The microcirculation can not only prevent the low-temperature coolant from entering the heat exchanger in large amounts and taking away heat from the transmission fluid but also ensure that the first coolant is heated up quickly, so that the first coolant can reach the set temperature more quickly. The first valve port 91 is opened to further accelerate the heating of the transmission fluid. The other parts of the present embodiment are the same as or similar to those of the above-mentioned embodiments and will not be repeated here.

It should be noted here that the passage 200 may also be configured to be a through hole, where one end of the through hole is in communication with the flow passage 100 and the other end of the through hole is in communication with the first cavity 8. It should be further noted here that the large diameter portion 31 of the first body may be provide with the passage 200.

In the present disclosure, the above-mentioned thermostatic valve is disposed in the automobile transmission fluid cooling system, so that when the transmission fluid needs to be heated, the low-temperature coolant can be prevented from flowing into the heat exchanger in large amounts for the heat exchange with the lubricating oil and taking away heat from the lubricating oil, while the coolant reaching the required temperature can flow into the heat exchanger for the heat exchange with the lubricating oil to heat the lubricating oil.

What is claimed is:

1. A thermostatic valve, comprising:
a first valve body, a second valve body, a third valve body, a first thermal actuator, a second thermal actuator, a valve core, a first valve port, a second valve port and a third valve port; wherein
the first valve body comprises a second cavity and a third cavity, the second thermal actuator is sealedly fixed in the first valve body to isolate the second cavity from the third cavity;
at least a part of the valve core is located in the second cavity, and the valve core is connected to, or is integrated with, or abuts against a second valve stem of the second thermal actuator;
the second thermal actuator is configured to act in response to a change in temperature of a fluid in the third cavity, and the valve core is configured to open the second valve port or the third valve port in response to an action of the second valve stem;
one end of the second valve body is fixed to the first valve body, and another end of the second valve body is fixed to the third valve body; the third valve body comprises a first cavity, the second valve body comprises a flow passage, and the flow passage is capable of communicating with the first cavity through the first valve port and capable of communicating with the second cavity through the second valve port; and
the first thermal actuator is configured to act in response to a change in temperature of a fluid in the first cavity to open or close the first valve port or to adjust an opening degree of the first valve port.

2. The thermostatic valve according to claim 1, wherein the third valve body comprises a first inlet passage, the first valve body comprises a second inlet passage and a first outlet passage, the second inlet passage is in communication with the second cavity, the first outlet passage is in communication with the second cavity, and the first valve port is located at an end of the flow passage closer to the third valve body; and wherein the thermostatic valve comprises at least two working states: a first working state and a second working state; wherein in the first working state, the first valve port and the third valve port are closed, the second valve port is opened, the first inlet passage is not in communication with the first outlet passage, and the second inlet passage is not in communication with the first outlet passage; and in the second working state, the third valve port is closed, the first valve port and the second valve port are opened, the first inlet passage is in communication with the first outlet passage through the first valve port and the second valve port, and the second inlet passage is not in communication with the first outlet passage.

3. The thermostatic valve according to claim 2, further comprising a first spring wherein an inner wall of the third valve body is formed with a first shoulder on a side of the first cavity facing towards the first inlet passage; and the first thermal actuator comprises a first body and a first valve stem, one end of the first valve stem is inserted into the first body, the first body comprises a large diameter portion and a small diameter portion; wherein the large diameter portion of the first body is provided with a first end wall portion on a side of the first body facing away from the small diameter portion, and the first end wall portion is configured to mate with one end of the second valve body to close the flow passage.

4. The thermostatic valve according to claim 3, wherein the large diameter portion of the first body is provided with a second end wall portion on a side facing towards the small diameter portion of the first body, the first spring comprises a small end portion and a large end portion, the first spring is sleeved on the first body, the small end portion abuts against the second end wall, and the large end portion abuts against the first shoulder.

5. The thermostatic valve according to claim 4, wherein the second valve body further comprises a valve stem seat, the valve stem seat is disposed in the flow passage, and the valve stem seat comprises a blind hole portion and a communicating hole, wherein the communicating hole is in communication with flow passages on both sides of the valve stem seat, the blind hole portion comprises a blind hole, one end of the first valve stem is inserted into the blind hole, the first valve stem is clearance-fitted with the blind hole, and the first valve stem abuts against a bottom of the blind hole.

6. The thermostatic valve according to claim 5, wherein the second valve body comprises a tubular body, wherein the tubular body comprises a first port portion and a second port portion, the tubular body is provided with a first annular protrusion adjacent to the first port portion, a first annular groove is provided between the first port portion and the first annular protrusion, the tubular body is provided with a second annular protrusion adjacent to the second port portion, and a second annular groove is provided between the second port portion and the second annular protrusion;

the thermostatic valve is provided with a first sealing ring at the first annular groove, wherein a part of the first sealing ring is accommodated in the first annular groove, and the first sealing ring is configured to seal a connection between the second valve body and the third valve body;

the thermostatic valve is provided with a second sealing ring at the second annular groove, wherein a part of the second sealing ring is accommodated in the second annular groove, and the second sealing ring is configured to seal a connection between the second valve body and the first valve body.

7. The thermostatic valve according to claim 6, further comprising a circlip; wherein the third valve body further comprises a first connecting portion, and the first connecting portion comprises a small diameter portion and a large diameter portion; and the first valve body comprises a second connecting portion, and the second connecting portion comprises a large diameter portion and a small diameter portion; wherein the first port portion extends into the first connecting portion and is fixedly connected to the first connecting portion by the circlip, the first port portion is clearance-fitted with the small diameter portion of the first connecting portion, and the first annular protrusion is clearance-fitted with the large diameter portion of the first connecting portion; and the second port portion extends into the second connecting portion and is fixedly connected to the second connecting portion by the circlip, the second port portion is clearance-fitted with the small diameter portion of the second connecting portion, and the second annular protrusion is clearance-fitted with the large diameter portion of the second connecting portion.

8. The thermostatic valve according to claim 7, wherein an inner circumferential surface of the large diameter portion of the first connecting portion is provided with a first planar portion, the second valve body is provided with a second planar portion, and an inner circumferential surface of the large diameter portion of the second connecting portion is provided with a third planar portion, wherein one end of the second planar portion mates with the first planar portion, and another end of the second planar portion mates with the third planar portion.

9. The thermostatic valve according to claim 8, wherein the first valve body further comprises a third inlet passage and a second outlet passage, wherein the second outlet passage is in communication with the third cavity, and the third inlet passage is in communication with the third cavity.

10. The thermostatic valve according to claim 9, wherein the first outlet passage is communication with the second cavity at the small diameter portion of the second connecting portion, and the second cavity is partially formed in the small diameter portion of the second connecting portion.

11. The thermostatic valve according to claim 10, wherein the first valve body further comprises a seat hole portion, the seat hole portion is disposed between an inner wall of the first valve body corresponding to the second cavity and an inner wall of the first valve body corresponding to the third cavity, and the seat hole portion comprises a seat hole; and the second thermal actuator comprises a second body, the second body comprises a large diameter portion and a small diameter portion; wherein a diameter of the small diameter portion of the second body is less than an inner diameter of the seat hole, a space between the small diameter portion of the second body and an inner wall of the seat hole portion is in communication with the third cavity, the large diameter portion of the second body is clearance-fitted or interference fitted with the inner wall of the seat hole portion, and the small diameter portion of the second body penetrates through the seat hole into the third cavity.

12. The thermostatic valve according to claim 11, wherein the valve core comprises a cylindrical main body portion, wherein the cylindrical main body portion comprises a large diameter portion and a small diameter portion; and the valve core is provided with at least one column-shaped portion at an end of the small diameter portion, acing away from the large diameter portion, wherein the at least one column-shaped portion, at least partially extends into the flow passage and is slidably fitted with an inner wall of the second valve body corresponding to the flow passage.

13. The thermostatic valve according to claim 12, wherein at least a part of a peripheral wall of the main body portion is configured to be slidably fitted with the inner wall of the second valve body corresponding to the flow passage, and the large diameter portion of the main body portion is provided with an annular protrusion at a center or around the center of a side of the large diameter portion facing away from the small diameter portion; one end of the second valve stem of the second thermal actuator extends into the annular protrusion and abuts against the large diameter portion of the main body portion, and the second valve stem of the second thermal actuator is clearance-fitted with the annular protrusion;
- the second port portion is further provided with a first end annular groove at an end of the second port portion; and
- a second spring is sleeved on the small diameter portion of the main body portion, one end of the second spring abuts against the large diameter portion of the main body portion, and another end of the second spring abuts against the first end annular groove.

14. The thermostatic valve according to claim 1, wherein a circumferential surface of the large diameter portion of the second body is further with a third annular groove, a fourth annular groove, and a fifth annular groove, the fourth annular groove is disposed between the third annular groove and the fifth annular groove, and the first valve body is provided with a ninth through hole at a position of the first valve body corresponding to the fourth annular groove;
- the thermostatic valve further comprises a clip which penetrate through the ninth through hole and mates with the fourth annular groove; the thermostatic valve is provided with a third sealing ring at the third annular groove and at the fifth annular groove separately, wherein the third sealing ring is configured to isolate a fluid in the second cavity from the fluid in the third cavity; and an inner circumferential surface of the small diameter portion of the second connecting portion is provided with a guiding rib which mates with a circumferential surface of the large diameter portion of the main body portion.

15. The thermostatic valve according to claim 7, wherein the valve core comprises a cylindrical main body portion, wherein the cylindrical main body portion comprises a large diameter portion and a small diameter portion; and the valve core is provided with at least one column-shaped portion at an end of the small diameter portion, facing away from the large diameter portion, wherein the at least one column-shaped portion, at least partially extends into the flow passage and is slidably fitted with an inner wall of the second valve body corresponding to the flow passage.

16. The thermostatic valve according to claim 1, wherein the valve core comprises a cylindrical main body portion, wherein the cylindrical main body portion comprises a large diameter portion and a small diameter portion; and the valve core is provided with at least one column-shaped portion at an end the small diameter portion, facing away from the large diameter portion, wherein the at least one column-shaped portion, at least partially extends into the flow passage and is slidably fitted with an inner wall of the second valve body corresponding to the flow passage.

17. The thermostatic valve according to claim 16, wherein a circumferential surface of the large diameter portion of the second body is further with a third annular groove, a fourth annular groove, and a fifth annular groove, the fourth annular groove is disposed between the third annular groove and the fifth annular groove, and the first valve body is provided with a ninth through hole at a position of the first valve body corresponding to the fourth annular groove;
- the thermostatic valve further comprises a clip which penetrate through the ninth through hole and mates with the fourth annular groove: the thermostatic valve is provided with a third sealing ring at the third annular groove and at the fifth annular groove separately, wherein the third sealing ring is configured to isolate a fluid in the second cavity from the fluid in the third cavity and an inner circumferential surface of the small diameter portion of the second connecting portion is provided with a guiding rib which mates with a circumferential surface of the large diameter portion of the main body portion.

18. The thermostatic valve according to claim 17, wherein the first valve, the second valve body, the third valve body and the valve core are made of plastic materials and integrally formed through an injection molding process;
- the thermostatic valve is further provided with a passage parallel to the first valve port, wherein one end of the passage is in communication with the first cavity, another end of the passage is in communication with the flow passage, and a flow rate of the passage is much less than a flow rate of the first valve port; and
- when the first body abuts against the first port portion, the first valve port is closed, and the flow passage is in communication with the first inlet passage through the passage and the first cavity.

\* \* \* \* \*